(12) United States Patent
Soula et al.

(10) Patent No.: US 10,399,663 B2
(45) Date of Patent: Sep. 3, 2019

(54) INTEGRATED RIBS FOR CENTRAL WING BOX

(71) Applicant: AIRBUS OPERATIONS (S.A.S.), Toulouse (FR)

(72) Inventors: Denis Soula, Toulouse (FR); Matthieu Plet, La Salvetat-Saint-Giles (FR); Javier Maqueda Lahoz, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 282 days.

(21) Appl. No.: 15/255,639

(22) Filed: Sep. 2, 2016

(65) Prior Publication Data

US 2017/0066520 A1    Mar. 9, 2017

(30) Foreign Application Priority Data

Sep. 4, 2015 (FR) .................................... 15 58205

(51) Int. Cl.
*B64C 3/18* (2006.01)
*B64C 1/06* (2006.01)
*B64C 1/26* (2006.01)
*B64C 3/22* (2006.01)

(52) U.S. Cl.
CPC ............. *B64C 3/187* (2013.01); *B64C 1/06* (2013.01); *B64C 1/26* (2013.01); *B64C 3/185* (2013.01); *B64C 3/22* (2013.01)

(58) Field of Classification Search
CPC .. B64C 3/187; B64C 1/06; B64C 1/26; B64C 3/185; B64C 3/22; B64C 3/26
See application file for complete search history.

(56) References Cited

U.S. PATENT DOCUMENTS

| 1,619,372 A | * | 3/1927 | Rohrbach | B64C 3/00 244/123.4 |
| 7,597,287 B2 | | 10/2009 | Gay | |
| 7,810,756 B2 | * | 10/2010 | Alby | B64C 1/26 244/119 |
| 8,720,823 B2 | * | 5/2014 | Lafly | B64C 1/26 244/119 |
| 8,899,520 B2 | * | 12/2014 | Barmichev | B64C 1/00 244/119 |

(Continued)

FOREIGN PATENT DOCUMENTS

EP     1580120 A1    9/2005
WO  WO 2013-137915 A1  9/2013

OTHER PUBLICATIONS

European Search Report for EP 15 58205 dated Jul. 13, 2016.

*Primary Examiner* — Philip J Bonzell
(74) *Attorney, Agent, or Firm* — Jenkins, Wilson, Taylor & Hunt, P.A.

(57) ABSTRACT

A central wing box for an aircraft, including a top panel, a bottom panel, a front spar, a rear spar, and at least one secondary rib. A secondary rib includes two stiffeners, a first stiffener extending adjacent to the top panel and to one of the front spar and the rear spar, and a second stiffener extending adjacent to the bottom panel and to the other of the front spar and the rear spar. A reduced number of components can be employed, thereby simplifying the construction of the central wing box of an aircraft, particularly the installation of the secondary ribs.

20 Claims, 4 Drawing Sheets

(56) References Cited

U.S. PATENT DOCUMENTS

| | | | | |
|---|---|---|---|---|
| 9,004,406 B2* | 4/2015 | Soenarjo | ............ | B64C 1/26 |
| | | | | 244/123.1 |
| 9,199,719 B2* | 12/2015 | Durand | ............ | B64C 3/185 |
| 2005/0230528 A1* | 10/2005 | Gay | ............ | B64C 3/18 |
| | | | | 244/34 R |
| 2007/0023573 A1* | 2/2007 | Neale | ............ | B64C 3/00 |
| | | | | 244/124 |
| 2013/0062467 A1* | 3/2013 | Soenarjo | ............ | B64C 1/26 |
| | | | | 244/123.1 |

* cited by examiner

INTEGRATED RIBS FOR CENTRAL WING BOX

CROSS-REFERENCE TO RELATED APPLICATION

This application claims priority to French Patent Application FR 15 58205 filed Sep. 4, 2015, the entire disclosure of which is incorporated by reference herein.

TECHNICAL FIELD

The disclosure herein relates to a rib for the central wing box of an aircraft, and more particularly to an internal rib referred to as a secondary rib.

BACKGROUND

In FIG. 1, the structure of an aircraft comprises a fuselage 101 and a wing structure 102 which are joined together by a central box 103 referred to as the central wing box of the aircraft. The central wing box 103 notably withstands loading applied in flight to the wings of the aircraft.

The central wing box 103, and two frames 104 between which it is positioned, are depicted in FIG. 1 in heavy line. An orthonormal frame of reference in which: the axis Ox corresponds to the longitudinal axis of the aircraft, which axis extends from the tail cone to the nose cone of the aircraft; the axis Oy corresponds to the transverse axis of the aircraft, making with the axis Ox a plane that is horizontal when the aircraft is standing on a horizontal surface; and the axis Oz corresponds to the heightwise axis of the aircraft, corresponding to the vertical when the aircraft is standing on a horizontal surface, is also depicted.

FIG. 2 illustrates a detailed view of one example of a central wing box 103 oriented in space in the same way as in FIG. 1. The central wing box 103 in particular comprises: a top panel 1031, or extrados panel, extending substantially in a plane parallel to the plane (xOy), but slightly inclined and curved relative to this plane; a bottom panel, or intrados panel, extending under the top panel, substantially parallel thereto (not visible in FIG. 2); a front spar 1033, extending in a plane parallel to the plane (yOz); and a rear spar, extending behind the front spar, parallel thereto (not visible in FIG. 2).

These four components together form a volume referred to as the "volume of interest". In general, this volume is closed laterally by two ribs referred to as end ribs, which extend one on each side of the aircraft in planes substantially parallel to the plane (xOz). In FIG. 2, only the left-hand end rib 1035 is visible. Extending inside the volume of interest are ribs, referred to as secondary ribs or internal ribs. The internal ribs extend in planes substantially parallel to the plane (xOz) or, in other words, in planes substantially orthogonal to the top and bottom panels and to the front and rear spars. The internal ribs extend parallel to any end ribs there might be. The internal ribs form reinforcing components to strengthen the wing box 103.

Other elements of FIG. 2 will be described further herein.

FIG. 3 schematically illustrates one embodiment of a secondary rib 200 according to the prior art, viewed in a plane parallel to the plane (xOz). The secondary rib 200 comprises a vertical post 201, which extends along the axis (Oz), adjacent to the front spar and outside of the volume of interest as defined hereinabove. The vertical post 201 is also visible in FIG. 2. A rib flange 202 extends adjacent to the bottom panel 1032, inside the volume of interest, whereas an on-box beam 203 extends adjacent to the top panel 1031 and outside the volume of interest (see also FIG. 2). The on-box beam 203 extends adjacent to the top panel 1031 on one side, and to a horizontal plane on the other. Rod fittings 204 project into the volume of interest and from the on-box beam. Each rod fitting 204 has two openings, each accepting a rod 205. The two rods connected to the same rod fitting extend obliquely to the rib flange 202, delineating a triangle shape therewith. A secondary rib 200 according to the prior art has, for example, six rods. FIG. 3 also depicts floor links 206 which provide the connection between the secondary rib and the floor in the aircraft. These links all have more or less the same length along the axis (Oz). A second vertical post may extend adjacent to the rear spar.

One disadvantage with the secondary ribs 200 according to the prior art is that they are complicated to install, particularly the rods 205.

One objective of the present disclosure is to allow a simplification of the installation of the internal or secondary ribs of an aircraft central wing box.

SUMMARY

This objective is achieved with a central wing box for an aircraft, comprising a top panel, a bottom panel, a front spar, a rear spar, and at least one rib referred to as an internal rib, in which each internal rib comprises two pieces referred to as stiffeners arranged inside a volume delimited by the top panel, the bottom panel, the front spar, and the rear spar, a first stiffener extending adjacent to the top panel and to one of the front spar and the rear spar, and a second stiffener extending adjacent to the bottom panel and to the other of the front spar and the rear spar.

The wing box according to the disclosure herein comprises internal ribs that have an alternative structure to the one proposed in the prior art. This alternative structure makes it possible to dispense with the rods extending inside the volume of interest as defined in the introduction. Without these rods, installing the internal ribs is greatly simplified.

Preferably, at least one stiffener comprises: a first leg extending along adjacent to the top or bottom panel; a second leg extending along adjacent to the front or rear spar, a first end of the first leg and a first end of the second leg being joined together; and a reinforcing element extending from the first leg to the second leg.

The reinforcing element may extend from a second end of the second leg to a support region of the first leg, the support region being situated some distance from the ends of the first leg.

As an alternative, the reinforcing element may extend from a support region of the second leg to a support region of the first leg, each support region being situated some distance from the ends of the corresponding leg.

A stiffener may comprise a through-opening extending between the reinforcing element, the first leg and the second leg.

As an alternative, a region of a stiffener, situated between the reinforcing element, the first leg and the second leg, may be solid and of mechanical strength lower than that of the reinforcing element.

Advantageously, the second ends of the first and second legs of each stiffener of the same internal rib are superposed in pairs.

Preferably, second ends of the first and second legs of each stiffener of the same internal rib are joined together in pairs.

At least one stiffener may comprise a series of cavities, distributed along the first leg and designed to accommodate stiffeners of the bottom or top panel to which the first leg is adjacent.

The disclosure herein also relates to a method of installing an internal rib of a central wing box according to the disclosure herein, comprising the following steps: installing the first stiffener adjacent to the top panel and to one of the front spar and the rear spar; and installing the second stiffener adjacent to the bottom panel and to the other of the front spar and the rear spar.

BRIEF DESCRIPTION OF THE DRAWINGS

The present disclosure will be better understood from reading the description of exemplary embodiments given purely by way of entirely non-limiting example and with reference to the attached drawings in which.

DETAILED DESCRIPTION

The central wing box according to the disclosure herein corresponds more or less to a central wing box according to the prior art, in which at least one internal rib according to the prior art is replaced by an internal rib according to the disclosure herein. Preferably, each internal rib according to the prior art is replaced by a respective internal rib according to the disclosure herein.

Figure 4:
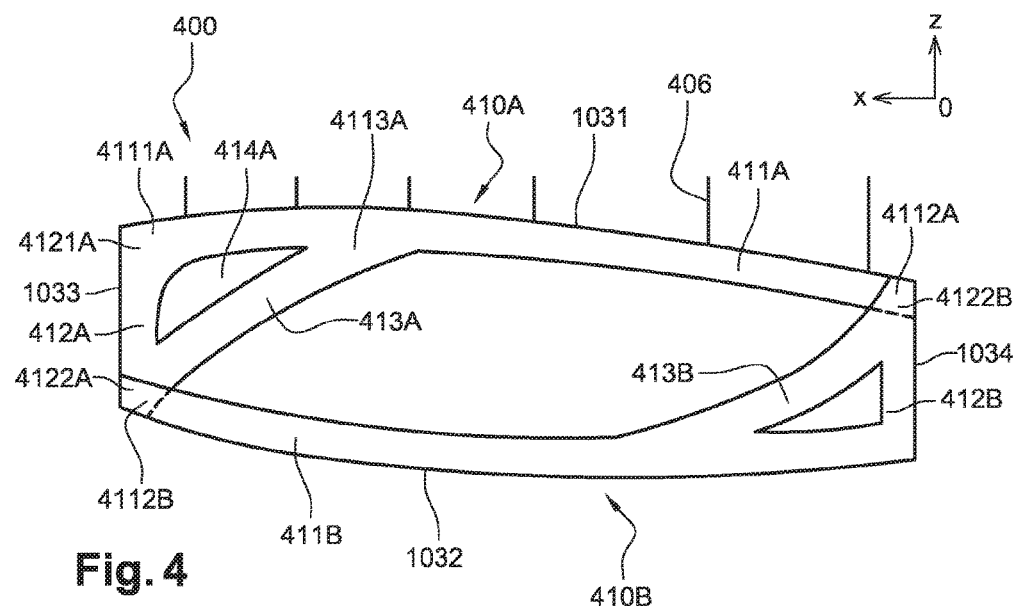
FIG. 4 is a schematic face-on illustration of a first embodiment of an internal rib according to the disclosure herein.

FIG. 4 schematically illustrates a first embodiment of an internal rib 400 according to the disclosure herein.

The internal rib 400 extends in a plane parallel to the plane (xOz). When end ribs are present, the internal rib 400 extends in a plane parallel to the plane of the end ribs. The internal rib is made up chiefly of two stiffeners 410A and 410B, both situated entirely inside the useful volume as defined in the introduction.

A first stiffener 410A extends adjacent to the top panel 1031 and to the front spar 1033. It extends along the entire extent of the respective profiles of the top panel 1031 and of the front spar 1033, inside the central wing box. These profiles are defined by the intersection of the top panel 1031 and, respectively, of the front spar 1033, with a plane parallel to the plane (xOz) passing through the first stiffener 410A. According to an alternative form that has not been depicted, the first stiffener 410A does not extend along the entire extent of the profiles, but nevertheless does extend over more than three quarters of this extent.

A second stiffener 410B extends adjacent to the bottom panel 1032 and to the rear spar 1034. It extends along the entire extent of the respective profiles of the bottom panel 1032 and of the rear spar 1034, inside the central wing box. These profiles are defined by the intersection of the bottom panel 1032 or, respectively, of the rear spar 1034, with a plane parallel to the plane (xOz) passing through the second stiffener 410B. According to an alternative form that has not been depicted, the second stiffener 410B does not extend over the entire extent of the profiles, but does nevertheless extend over more than three quarters of this extent.

The internal rib is made in just two pieces, each being attached to a spar and to a panel. These two components together provide optimum support for the panels to prevent phenomena of buckling. They contribute to the rigidity of the central wing box.

Installing an internal rib then simply comprises or consists of positioning and securing each of the two stiffeners.

Each stiffener is formed as a single piece at the time that it is installed in the central wing box.

The assembly according to the prior art, comprising the rib flange, the on-box beam, the at least one vertical post, the rod fittings and the series of several rods according to the prior art, is replaced by two stiffeners situated inside the useful volume defined in the introduction. Assembling the internal rib is thus greatly simplified.

The entirety of the internal rib lies inside the volume of interest defined in the introduction, and this likewise makes assembly easier.

The disclosure herein offers the advantage of not requiring modifications to the overall structure of the central wing box of the aircraft, notably to the bottom and top panels, the front and rear spars and, where present, the end ribs.

Constructing the rib as two components allows it to be fitted accurately to each central wing box, it being possible for this box to exhibit dimensions that differ slightly from one individual example to another depending on the manufacturing and positioning tolerances acceptable therefor. Fitting involves only a very limited number of elements. The positions of the first and second stiffener are simply adjusted.

The internal rib according to the disclosure herein has a mechanical strength suited to the model of aircraft for which it is intended, preferably at least equivalent to that of the corresponding internal rib of the prior art. In particular, it is able to absorb all of the following:

pressure loading, parallel to the axis (Oz), exerted notably as a result of the difference in pressure between the central wing box and the cabin;

loading on the front spar, caused by the aviation fuel upon impact with the ground; and loading referred to as "positive gust" loading, corresponding to significant flexing of the wings of the aircraft relative to the fuselage.

The internal rib according to the disclosure herein no longer comprises a series of rods, but simply comprises two substantially planar components extending parallel to the plane (xOz).

In the prior art, there is a certain tolerance on the positioning of the holes in the rod fittings, intended to accommodate the pivot about which one end of the rod pivots. The slight differences that may exist, from one individual example of wing box to another, need to be taken into consideration when mounting the rods. In particular, the spacing between the two pivots about which each rod pivots needs to be measured and the rod needs then to be customized for length. According to the disclosure herein, these rods are dispensed with, making it possible to dispense with this customization with regard to length. The mounting of the internal rib is therefore greatly simplified.

The first stiffener 410A, as illustrated in FIG. 4, will now be described in greater detail. This is a rigid component made up of two legs and a reinforcing element.

A first leg 411A extends adjacent to the top panel 1031. The first leg 411A follows the profile of the top panel 1031, this profile being defined by the intersection between this top panel and a plane parallel to the plane (xOz) passing through the first leg 411A.

A second leg 412A extends adjacent to the front spar 1033. The second leg 412A follows the profile of the front spar 1033, this profile being defined by the intersection between this front spar and a plane parallel to the plane (xOz) passing through the second leg 412A.

The first and second legs each preferably have a planar shape, extending in a plane parallel to the plane (xOz). The first and second legs have reduced widths in this plane.

The first leg 411A and the second leg 412A are joined together at their respective first ends 4111A, 4121A, at the corner formed between the top panel 1031 and the front spar 1033.

In order to strengthen the assembly formed by these two legs, a reinforcing element 413A extends between them, connected on one side to the first leg 411A and on the other to the second leg 412A. The reinforcing element extends in the plane of the first and second legs 411A, 412A. It extends obliquely relative to the first and second legs 411A, 412A. It has a planar shape, parallel to the plane (xOz), of width preferably less than or equal to the mean width of the first and second legs.

In the example illustrated in FIG. 4, the reinforcing element 413A extends from the second end 4122A of the second leg to a support region 4113A of the first leg. The second end 4122A of the second leg is the opposite end of the second leg to the first end 4121A as defined hereinabove.

The support region 4113A is situated some distance from the ends of the first leg 410A. The distance between the center of the support region and the ends 411A, 412A of the first leg, along the profile of the top panel 1031, is, for example, greater than 10% or even 20% of the length of the first leg.

The support region 4113A is, for example, adjacent to the second fifth of the profile of the top panel 1031 (the panel to which the first leg 411A is adjacent). This profile is measured from the intersection of this top panel with the front spar (the spar to which the second leg 412A is adjacent), to the intersection of this top panel with the rear spar. This is a panel profile, inside the central wing box. This profile is defined by the intersection between the top panel and the plane parallel to the plane (xOz) passing through the first leg 411A. This profile does not necessarily extend in a straight line. The length of the profile does not denote its dimension along (Ox) but its extent inside the wing box and in the plane parallel to (xOz).

Thus, considering a profile of length l=L, with l=0 at the intersection with the front spar 1033, the support region extends from l=L/5=L*0.2 to l=2L/5=L*0.4. As an alternative, the support region is situated in the second third of the profile. According to another alternative form, the support region is situated in the second quarter of the profile.

In other words, the reinforcing element 413A may extend from the second end 4122A of the second branch to a support region 4113A of the first leg, the support region being adjacent to the second fifth of the profile of the corresponding bottom or top panel, the profile being defined in a plane parallel to the internal ribs and passing through the first leg, and a length of the profile being measured from its intersection with the front or rear spar to which the second leg is adjacent.

According to an alternative form that has not been depicted, the reinforcing element extends from a support region of the second leg to a support region of the first leg, each support region being situated some distance from the ends of the corresponding leg. The distance between the center of a support region and the ends of the corresponding leg, along the profile of the top panel or, respectively, the bottom panel, is for example greater than 10% or even 20% of the length of the leg.

Configuring the stiffener as two legs and a reinforcing element between them makes it possible to limit its bulk, for the same mechanical strength.

The positioning of the reinforcing element described hereinabove, and the siting of the support region offer optimum mechanical strength and optimum transmission of load, whether the load is oriented along (Oz) or along (Ox).

In the example depicted in FIG. 4, the space situated between the first and second legs 411A, 412A and the reinforcing element 413A is a simple through-opening 414A, or in other words a hole. As an alternative, this space may be solid. When this space is solid, it may have mechanical strength lower than that of the reinforcing element, for example more than two times lower. In practice, this lower mechanical strength may manifest itself in a smaller thickness along the axis (Oy).

The second stiffener 410B has the same structure as the first stiffener 410A. Whereas the first stiffener 410A extends along the top panel 1031 and the front spar 1033, the second stiffener 410B extends along the bottom panel 1032 and the rear spar 1034. The second stiffener 410B has a first leg 411B adjacent to the bottom panel 1032, a second leg 412B adjacent to the rear spar 1034, and a reinforcing element 413B between the two.

The two stiffeners extend, more or less symmetrically, inside the volume of interest defined in the introduction. The degree of superposition between the second stiffener and the symmetry with the first stiffener is greater than or equal to 90%, or even 95%.

In the example depicted in FIG. 4, the first and second stiffener 410A, 410B are superposed, at the two corners formed respectively between the top panel 1031 and the rear spar 1034, and between the bottom panel 1032 and the front spar 1033. In particular, the second end 4112A of the first leg 411A (on the opposite side to its first end 4111A) is superposed with the second end 4122B of the second leg 412B, and the second end 4112B of the first leg 411B is superposed with the second end 4122A of the second leg 412A.

Figure 1:
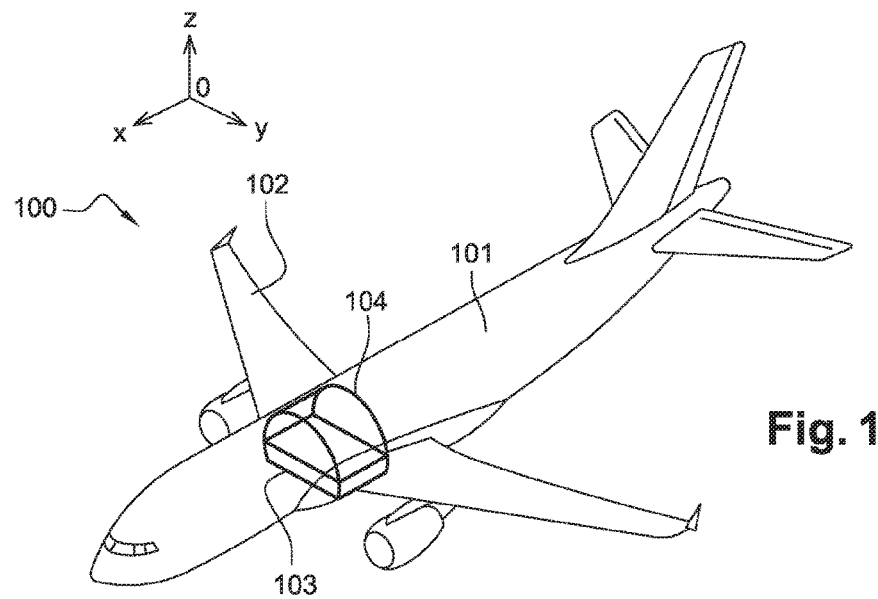
FIG. 1 is a schematic perspective illustration of an aircraft and notably of the central wing box of the aircraft.
Figure 2:
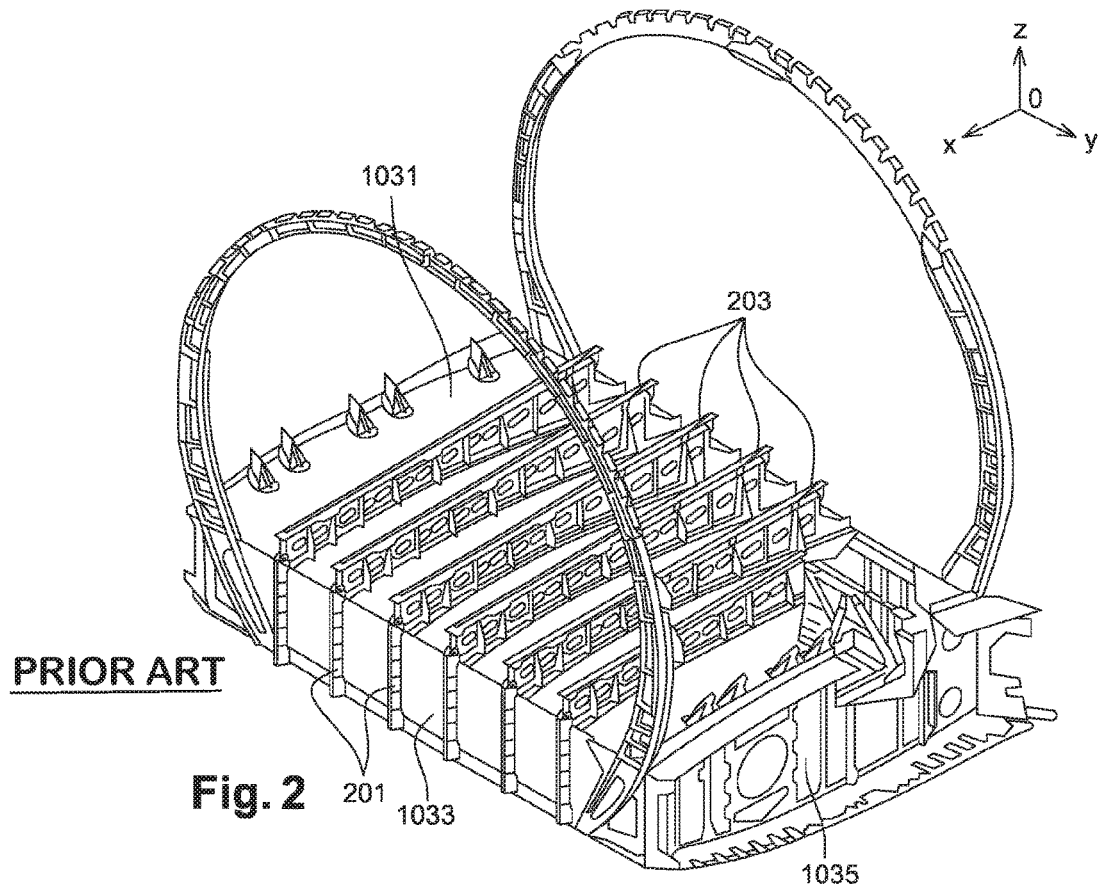
FIG. 2 is a perspective illustration of one example of an aircraft wing box according to the prior art.
Figure 3:
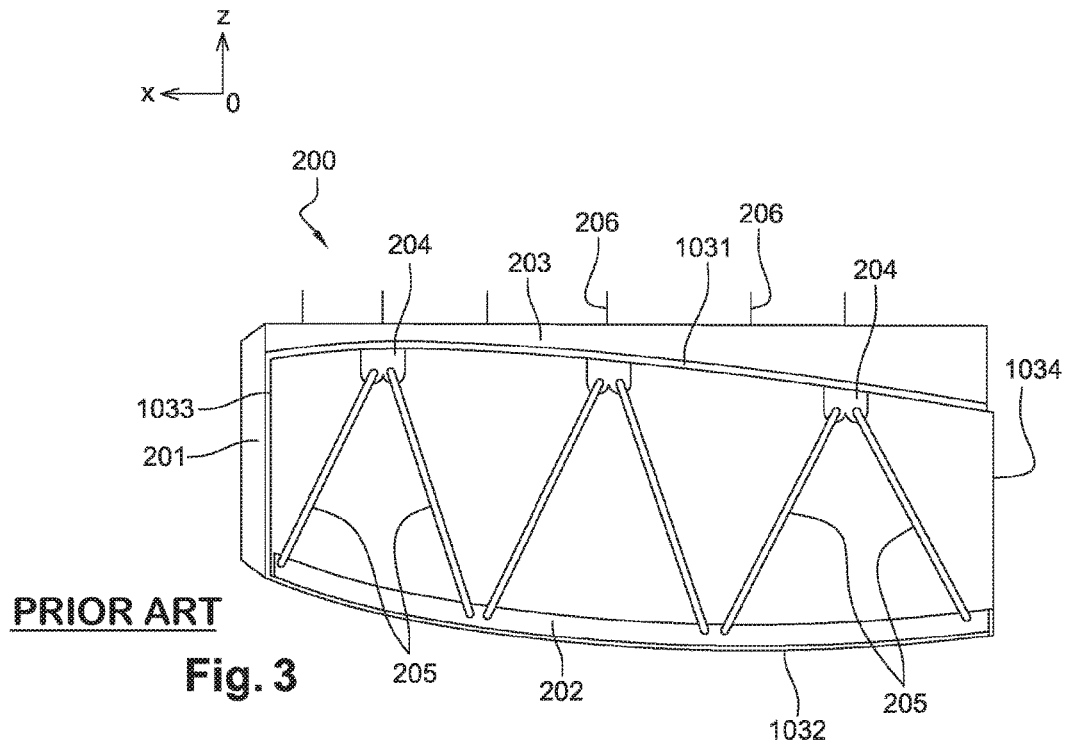
FIG. 3 is a face-on illustration of an internal rib according to the prior art.

Because the on-box beam illustrated in FIG. 3 has been dispensed with, the floor links 406, which provide the connection between the internal rib and the floor of the aircraft have variable lengths, along the profile of the top panel. For example, the ratio between the longest link and the shortest link is greater than 1.5.

At least one stiffener may be made up of metal plates that have been machined, or deformed by stamping, pressing or forging. In addition or as an alternative, at least one stiffener may be made up of several metal beams fixed together.

Figure 5:
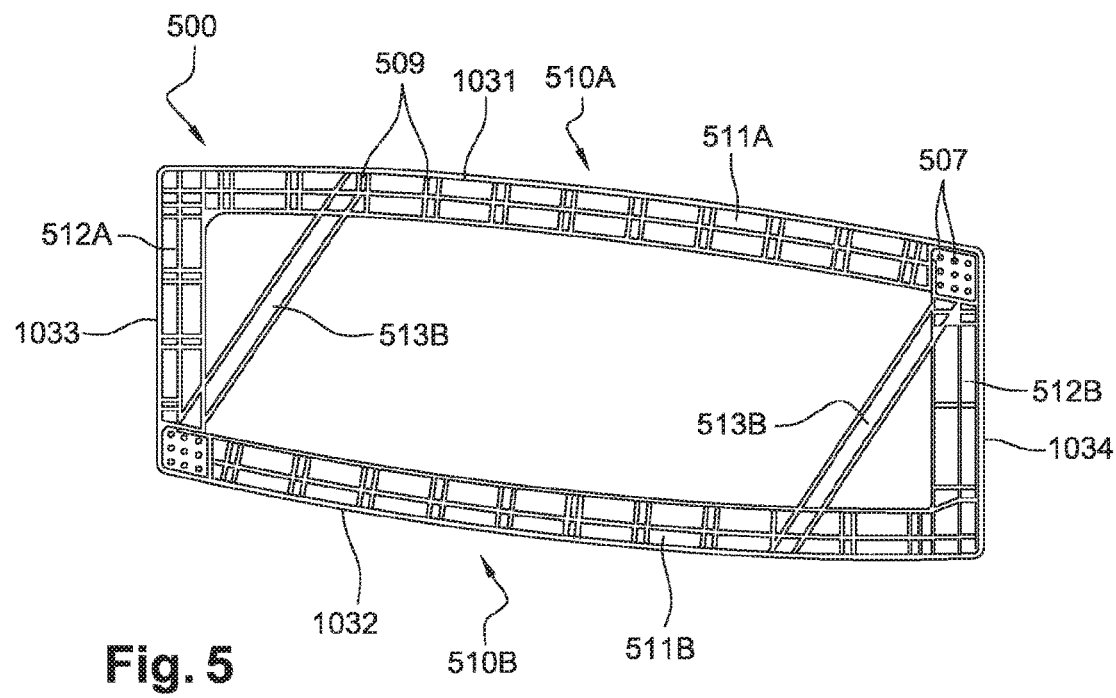
FIG. 5 illustrates a first alternative form of the embodiment depicted in FIG. 4.

FIG. 5 illustrates, in a perspective view, one particular alternative form 500 of the internal rib illustrated in FIG. 4. FIG. 5 again shows the two stiffeners 510A, 510B each comprising a first leg 511A, 511B respectively, a second leg 512A, 512B respectively, and a reinforcing element 513A, 513B respectively.

The stiffeners are each made from at least one machined metal plate. In particular, various elements are cut from a metal plate and assembled with one another.

As an alternative, the stiffeners are each made by deforming at least one metal plate. The deformation may be obtained by stamping, pressing or forging.

As an alternative, the stiffeners are each produced by assembling metal beams joined together by welding and/or nuts and bolts.

The first leg, the second leg and the reinforcing element may be produced separately, and these three pieces are then joined together, before being installed inside the volume of interest of the central wing box of the aircraft.

Each stiffener has, at certain points, shapes that provide rigidity, for example turned-over edges referred to as "flanged edges".

The first and second stiffeners 510A, 510B are superposed at two points, as described with reference to FIG. 4. They are fixed together at the regions of superposition, for example using rivets. In the example depicted in FIG. 5, the second ends of each leg of the two stiffeners each have a series of bores 507 to accept rivets, for example between three and nine bores.

According to an alternative form which has not been depicted, the second ends of the legs of the stiffeners are fixed together in pairs without being superposed. They are then fixed together indirectly at two points, for example using two intermediate components each one positioned at one of these two points.

Figure 6:
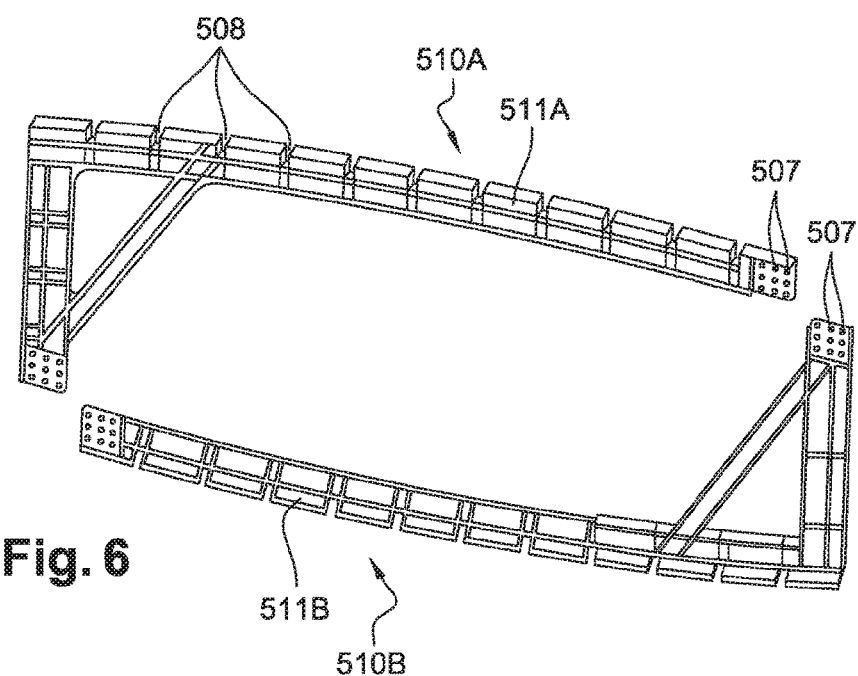
FIG. 6 is an exploded view of the internal rib depicted in FIG. 5.

FIG. 6 corresponds to FIG. 5, this time depicted in exploded view. FIG. 6 notably shows that each second end of each leg of the stiffeners has nine bores, distributed in a square mesh arrangement and together forming a three by three square of bores.

In FIG. 5, the internal rib 500 is depicted as being set in between the top panel 1031, the bottom panel 1032, the front spar 1033 and the rear spar 1034. FIG. 6 depicts the internal rib 500 on its own. FIG. 6 shows cavities 508 distributed along each first leg 511A and 511B respectively, these cavities being able to accommodate stiffeners 509 of the top panel and bottom panel respectively. In other words, the profile of the first leg 511A (or 511B respectively) in a plane parallel to the plane (xOz) and on the side of the top (or respectively bottom) panel has a series of cavities 508. The stiffeners 509 are bars which extend from the top or, respectively, bottom, panel. These each fit into a cavity 508 and collaborate therewith to contribute to holding the internal rib in position relative to the top or, respectively, the bottom, panel.

In the example illustrated in FIGS. 5 and 6, the front and rear spars also have stiffeners which fit into corresponding cavities of the second legs 512A and 512B in order further to improve the retention of the internal rib in position.

At least one stiffener may be made of a composite material with a thermosetting or thermoplastic matrix.

Figure 7:
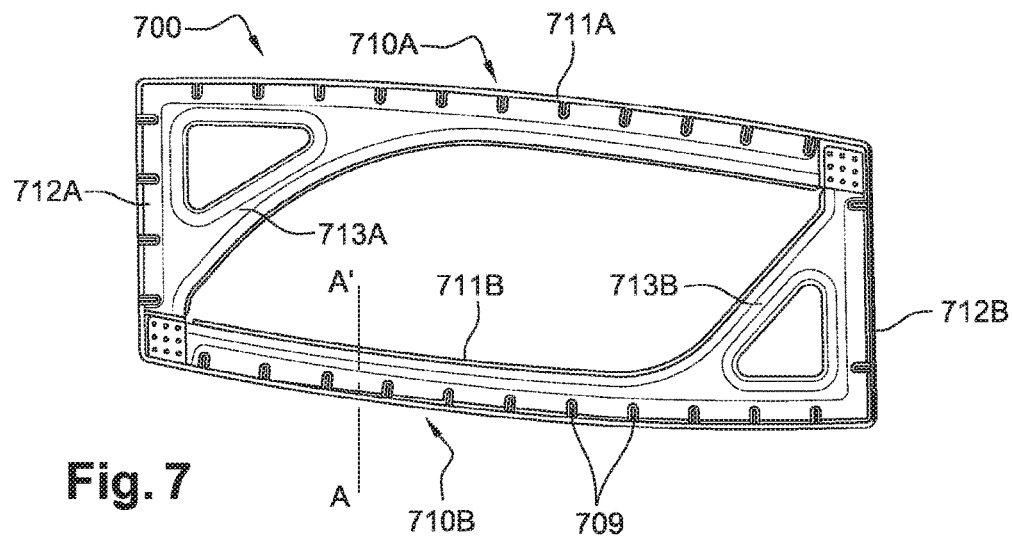
FIG. 7 illustrates a second alternative form of the embodiment depicted in FIG. 4.

FIG. 7 illustrates a second alternative form 700 of an internal rib as depicted schematically in FIG. 4. FIG. 7 again shows the two stiffeners 710A, 710B each comprising a first leg 711A, 711B respectively, a second leg 712A, 712B respectively, and a reinforcing element 713A, 713B respectively. The internal rib has been depicted as being installed, between the top and bottom panels and between the front and rear spars. It is notably possible to see the stiffeners 709 of each of these elements, set into corresponding cavities of the two stiffeners 710A, 710B.

Each stiffener 710A, 710B is made of carbon fiber reinforced resin (or CFRP which stands for carbon fiber reinforced polymer). Such a resin is a composite material with a thermosetting matrix, making it possible to manufacture components of low mass. Each stiffener may be produced by injection molding or by infusion (for example liquid resin infusion).

As an alternative, each stiffener is made of a composite material with a thermoplastic matrix containing fibers, notably made of carbon fiber. Such a component is produced by injection molding or by infusion. According to an advantageous alternative form, each stiffening component is produced by stamping. Stamping makes large variations in the thickness of the same mechanical component possible.

Embodiments in composite material offers a wide variety of possible shapes.

Figure 8:
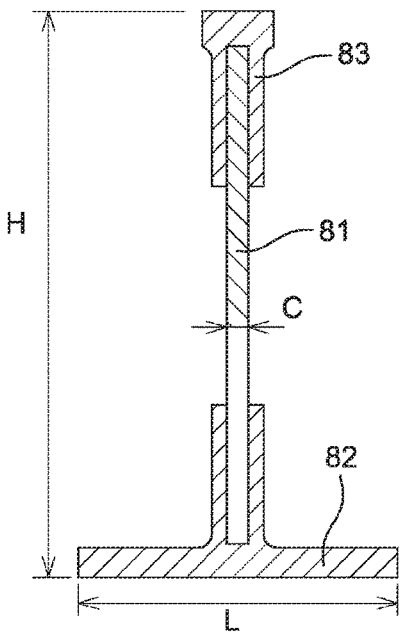
FIG. 8 is a view in cross section illustrating a detail of the internal rib depicted in FIG. 7.

FIG. 8 illustrates a view in cross section of the stiffener 710B, on a plane parallel to the plane (yOz) passing through the axis AA'.

The first leg 711B is planar, parallel to the plane (xOz). It has a thickness at the center (along Oy) denoted e, and a height (along Oz) denoted H, with the ratio H/e greater than or equal to 10, or even 20.

The first leg 711B has thicker edges, one of them extending from the side of the bottom panel, and the other on the opposite side of the first leg. For example, the thickness of the first leg at these edges is at least twice its thickness at the center e.

On the side adjacent to the panel, the stiffener has a T-shaped cross section, the horizontal bar of the T being adjacent to the panel. The H/L ratio between the height H and the length L of the horizontal bar of the T (along Oy) is approximately 2, for example between 1.5 and 3.

A person skilled in the art will easily know how to calculate the details for the sizing of a stiffener, notably using finite element calculation software.

FIG. 8 depicts a first leg formed of a central piece 81, a lower reinforcement 82 and an upper reinforcement 83. The central piece 81 has a thickness e. The lower reinforcement 82 surrounds a lower region of the central component to increase the thickness of the first leg 711B on the side of the bottom panel and form the horizontal bar of the T as defined hereinabove. The upper reinforcement 83 surrounds an upper region of the central component to increase the thickness of the first leg 711B on the opposite side to the bottom panel.

Figure 9:
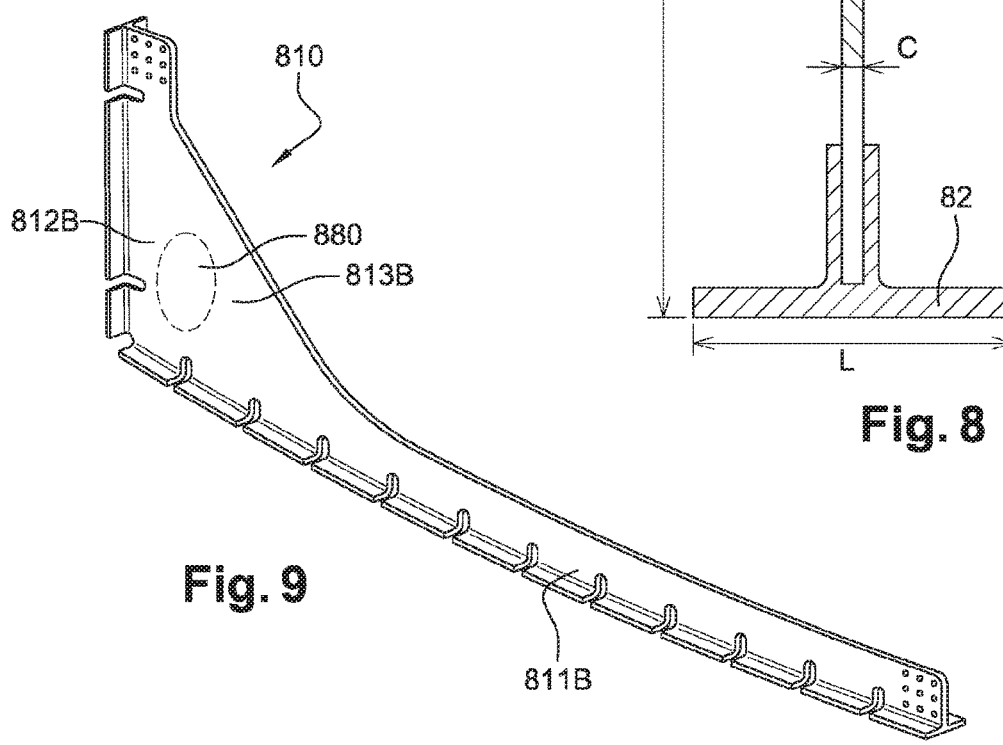
FIG. 9 illustrates a detail of a second embodiment of an internal rib according to the disclosure herein.

FIG. 9 illustrates a detail of a second embodiment of an internal rib according to the disclosure herein. FIG. 9 in particular illustrates a second stiffener 810B. The shape of this second stiffener 810B differs from the shape of the second stiffener illustrated notably in FIG. 7 in that the region 880 situated between the first and second legs 811B, 812B and the reinforcing element 813B is solid. It may nevertheless have a mechanical strength lower than that of the reinforcing element.

The stiffener 810B is formed for example from CFRP and produced by stamping.

The second stiffener 810B, once installed, is adjacent to the bottom panel and to the front spar. A first stiffener is therefore adjacent to the top panel and to the rear spar. A person skilled in the art will know how to vary the disclosure herein in numerous ways, notably form alternative forms of the embodiments presented with reference to FIGS. 4 through 8, in which the first stiffener is adjacent to the top panel and to the rear spar and the second stiffener is adjacent to the bottom panel and to the front spar.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A central wing box for an aircraft, the central wing box comprising:
   a top panel;
   a bottom panel;
   a front spar;
   a rear spar; and
   at least one internal rib, each internal rib comprising first and second stiffeners arranged inside a volume delimited by the top panel, the bottom panel, the front spar, and the rear spar;
   wherein the first stiffener extends, adjacent to the top panel and to one of the front spar or the rear spar, over more than three quarters of an extent of respective profiles of the top panel and of the front or rear spar inside the central wing box; and
   wherein the second stiffener extends, adjacent to the bottom panel and to whichever of the front spar or the rear spar the first stiffener is not adjacent, over more than three quarters of the extent of the respective profiles of the bottom panel and of the front or rear spar inside the central wing box.

2. The central wing box according to claim 1, wherein the profile of the top panel and/or the profile of the bottom panel comprises an entire length of the central wing box.

3. The central wing box according to claim 1, wherein at least one stiffener comprises:
   a first leg extending adjacent to the top or bottom panel and having a first end and a second end;
   a second leg extending adjacent to the front or rear spar and having a first end and a second end, the first end of the first leg and the first end of the second leg being joined together; and
   a reinforcing element extending from the first leg to the second leg.

4. The central wing box according to claim 3, wherein the reinforcing element extends from the second end of the second leg to a support region of the first leg, the support region being situated a distance from the first and second ends of the first leg.

5. The central wing box according to claim 3, wherein the reinforcing element extends from a support region of the second leg to a support region of the first leg, the support region of the first leg being situated a distance from the first and second ends of the first leg and the support region of the second leg being situated a distance from the first and second ends of the second leg.

6. The central wing box according to claim 3, wherein the at least one stiffener comprises a through-opening extending between the reinforcing element, the first leg, and the second leg associated with said at least one stiffener.

7. The central wing box according to claim 3, wherein a region of the at least one stiffener, which is situated between the reinforcing element, the first leg, and the second leg, is solid and comprises a mechanical strength that is lower than a mechanical strength of the reinforcing element.

8. The wing box according to claim 3, wherein the second ends of the first and second legs of each stiffener of a same internal rib are superposed in pairs.

9. The central wing box according to claim 3, wherein second ends of the first and second legs of each stiffener of a same internal rib are joined together in pairs.

10. The central wing box according to claim 3, wherein the at least one stiffener comprises a series of cavities that are distributed along the first leg and adapted to accommodate stiffeners of whichever of the bottom or top panel to which the first leg is adjacent.

11. A method of installing an internal rib of a central wing box comprising a top panel, a bottom panel, a front spar, a rear spar, and at least one internal rib, each internal rib comprising first and second stiffeners arranged inside a volume delimited by the top panel, the bottom panel, the front spar, and the rear spar, the method comprising:
   installing the first stiffener inside the central wing box at a position adjacent to the top panel and to one of the front spar and the rear spar so that the first stiffener extends over more than three quarters of an extent of respective profiles of the top panel and of the front spar or rear spar; and
   installing the second stiffener inside the central wing box at a position adjacent to the bottom panel and to whichever of the front spar and the rear spar the first stiffener is not adjacent so that the first stiffener extends over more than three quarters of an extent of respective profiles of the bottom panel and of whichever of the front spar or rear spar the first stiffener is not adjacent.

12. The method according to claim 11, wherein the profile of the top panel and/or the profile of the bottom panel comprises an entire length of the central wing box.

13. The method according to claim 11, wherein at least one stiffener comprises:
   a first leg extending adjacent to the top or bottom panel and having a first end and a second end;
   a second leg extending adjacent to the front or rear spar and having a first end and a second end, the first end of the first leg and the first end of the second leg being joined together; and
   a reinforcing element extending from the first leg to the second leg.

14. The method according to claim 13, wherein the reinforcing element extends from the second end of the second leg to a support region of the first leg, the support region being situated a distance from the first and second ends of the first leg.

15. The method according to claim 13, wherein the reinforcing element extends from a support region of the second leg to a support region of the first leg, the support region of the first leg being situated a distance from the first and second ends of the first leg and the support region of the second leg being situated a distance from the first and second ends of the second leg.

16. The method according to claim 13, wherein the at least one stiffener comprises a through-opening extending between the reinforcing element, the first leg, and the second leg associated with said at least one stiffener.

17. The method according to claim 13, wherein a region of the at least one stiffener, which is situated between the reinforcing element, the first leg, and the second leg, is solid and comprises a mechanical strength that is lower than a mechanical strength of the reinforcing element.

18. The method according to claim 13, wherein the second ends of the first and second legs of each stiffener of a same internal rib are superposed in pairs.

19. The method according to claim 13, wherein second ends of the first and second legs of each stiffener of a same internal rib are joined together in pairs.

20. The method according to claim 13, wherein the at least one stiffener comprises a series of cavities that are distributed along the first leg and adapted to accommodate stiffeners of whichever of the bottom or top panel to which the first leg is adjacent.

* * * * *